United States Patent
Tender et al.

(10) Patent No.: US 9,826,495 B2
(45) Date of Patent: *Nov. 21, 2017

(54) APPARATUS AND METHOD FOR TESTING SYNCHRONIZED TRANSMISSION BETWEEN SYSTEMS OPERATING AT DIFFERENT CLOCK RATES

(71) Applicant: Hughes Network Systems, LLC, Germantown, MD (US)

(72) Inventors: Neil H. Tender, Germantown, MD (US); Esmail H. Chitalwala, Germantown, MD (US)

(73) Assignee: HUGHES NETWORK SYSTEMS, LLC, Germantown, MD (US)

(*) Notice: Subject to any disclaimer, the term of this patent is extended or adjusted under 35 U.S.C. 154(b) by 161 days.

This patent is subject to a terminal disclaimer.

(21) Appl. No.: 14/586,077

(22) Filed: Dec. 30, 2014

(65) Prior Publication Data

US 2016/0192311 A1    Jun. 30, 2016

(51) Int. Cl.
*H04W 56/00*    (2009.01)
*H04B 7/185*    (2006.01)

(52) U.S. Cl.
CPC .... *H04W 56/0055* (2013.01); *H04B 7/18513* (2013.01); *H04B 7/18519* (2013.01); *H04W 56/0035* (2013.01)

(58) Field of Classification Search
None
See application file for complete search history.

(56) References Cited

U.S. PATENT DOCUMENTS

| | | | | |
|---|---|---|---|---|
| 4,581,736 A | * | 4/1986 | Dobyns | H04B 7/212 370/321 |
| 5,365,450 A | * | 11/1994 | Schuchman | G01S 5/0027 342/357.42 |
| 5,726,893 A | * | 3/1998 | Schuchman | G01S 5/0009 342/450 |
| 5,798,732 A | * | 8/1998 | Eshenbach | G01S 19/243 342/352 |
| 5,875,183 A | * | 2/1999 | Nitadori | G01S 5/12 370/328 |
| 6,198,730 B1 | * | 3/2001 | Hogberg | H04B 7/18563 370/320 |
| 6,529,485 B1 | * | 3/2003 | Agarwal | H04B 7/18513 370/324 |
| 6,529,547 B1 | * | 3/2003 | Alexander | H04B 17/29 340/605 |
| 6,542,754 B1 | * | 4/2003 | Sayers | H04B 7/269 370/350 |

(Continued)

*Primary Examiner* — Andrew Oh
(74) *Attorney, Agent, or Firm* — Nath, Goldberg & Meyer; Leonid D. Thenor (57) ABSTRACT

An apparatus and method are disclosed for testing synchronization of transmission between systems operating at different clock rates. The apparatus includes a transmitting unit configured to operate at a first clock rate, and a receiving unit configured to operate at a second clock rate that is different from the first clock rate. A compensation circuit receives a second clock rate from a frequency generating system, and synchronizes the data transmitted by the transmitting unit with the second clock rate. The synchronized data is then transmitted to the receiving unit.

24 Claims, 4 Drawing Sheets

(56) References Cited

U.S. PATENT DOCUMENTS

| | | | | |
|---|---|---|---|---|
| 6,571,082 B1* | 5/2003 | Rahman | H04B 17/0087 | 342/451 |
| 6,731,624 B1* | 5/2004 | Maekawa | H04J 3/0608 | 370/350 |
| 6,882,827 B1* | 4/2005 | Collier | H04B 17/20 | 455/423 |
| 2001/0041535 A1* | 11/2001 | Karmel | G01S 5/0027 | 455/12.1 |
| 2002/0105458 A1* | 8/2002 | Dooley | G01S 19/235 | 342/357.62 |
| 2002/0115436 A1* | 8/2002 | Howell | B60R 25/102 | 455/426.1 |
| 2003/0112179 A1* | 6/2003 | Gronemeyer | G01S 19/235 | 342/357.69 |
| 2003/0197641 A1* | 10/2003 | Stone | G01S 19/24 | 342/357.63 |
| 2004/0044506 A1* | 3/2004 | Meinila | G06F 17/141 | 703/5 |
| 2005/0089115 A1* | 4/2005 | Hartmann | H04L 27/22 | 375/285 |
| 2005/0201500 A1* | 9/2005 | Shizuki | G01R 31/31716 | 375/350 |
| 2005/0261833 A1* | 11/2005 | Brosius | G01S 5/0036 | 701/469 |
| 2005/0280576 A1* | 12/2005 | Shemesh | G01S 19/24 | 342/357.64 |
| 2006/0109895 A1* | 5/2006 | Watanabe | G01R 31/31922 | 375/224 |
| 2006/0122814 A1* | 6/2006 | Beens | G06F 15/7864 | 702/189 |
| 2006/0133468 A1* | 6/2006 | Chen | H04B 17/0085 | 375/224 |
| 2007/0160117 A1* | 7/2007 | Nitta | G01S 19/24 | 375/145 |
| 2007/0183378 A1* | 8/2007 | Passarella | H04L 47/10 | 370/338 |
| 2008/0043663 A1* | 2/2008 | Youssefzadeh | H04B 7/18528 | 370/321 |
| 2008/0270027 A1* | 10/2008 | Stecko | B64D 39/00 | 701/476 |
| 2009/0094492 A1* | 4/2009 | Music | G06F 11/261 | 714/715 |
| 2009/0121927 A1* | 5/2009 | Moshfeghi | G01S 19/07 | 342/357.24 |
| 2009/0219202 A1* | 9/2009 | Pon | G01S 19/42 | 342/357.25 |
| 2009/0259672 A1* | 10/2009 | Garudadri | G10L 19/005 | |
| 2009/0265059 A1* | 10/2009 | Medwin | B66F 9/0755 | 701/31.4 |
| 2010/0073229 A1* | 3/2010 | Pattabiraman | G01S 19/11 | 342/357.64 |
| 2010/0106416 A1* | 4/2010 | Yochum | G01C 21/165 | 701/469 |
| 2010/0226317 A1* | 9/2010 | Horn | H04W 16/10 | 370/329 |
| 2011/0128027 A1* | 6/2011 | Watanabe | G01R 31/318511 | 324/756.01 |
| 2011/0235621 A1* | 9/2011 | Ko | H04W 72/1215 | 370/338 |
| 2012/0233086 A1* | 9/2012 | Shin | G06Q 10/047 | 705/338 |
| 2013/0057434 A1* | 3/2013 | Krasner | G01S 5/0263 | 342/387 |
| 2013/0057436 A1* | 3/2013 | Krasner | G01S 19/11 | 342/464 |
| 2013/0188509 A1* | 7/2013 | Mellein | H04B 17/0085 | 370/252 |
| 2013/0301635 A1* | 11/2013 | Hollabaugh | H04W 56/0035 | 370/350 |
| 2013/0316728 A1* | 11/2013 | Bradley | H04W 24/00 | 455/456.1 |
| 2015/0071440 A1* | 3/2015 | Raghupathy | G06F 21/6245 | 380/258 |

* cited by examiner

APPARATUS AND METHOD FOR TESTING SYNCHRONIZED TRANSMISSION BETWEEN SYSTEMS OPERATING AT DIFFERENT CLOCK RATES

BACKGROUND INFORMATION

Consumers rely on modern communication systems for exchanging data when retrieving content for various applications. The data exchanged can include complex graphics or images, audio, video, etc. Consumers have also developed greater expectations of reliability with respect to data transfer between these systems. In many communication systems, the timing and synchronization of information between independent service providers systems must undergo testing, in order to ensure that the systems are capable of performing correctly.

Communications systems that do not undergo testing are susceptible to improper timing and synchronization that can result in drawbacks including errors, delay, and possibly complete loss of data. Consequently, errors can be introduced in the content that is delivered to users over the communications systems. These errors can ultimately result in a number of issues including user dissatisfaction, customer service complaints, and increased costs to both service providers and users. Accordingly, it is necessary to test synchronization between communications systems, especially when there are multiple systems operating on different timing clocks. Based on the foregoing, there is a need for testing synchronized transmission between systems which rely on different clock rates.

BRIEF SUMMARY

An apparatus and method for testing proper synchronization of transmission between systems operating at different clock rates is disclosed. According to an embodiment, the apparatus includes a transmitting unit that is configured to operate at a first clock rate. Additionally, a receiving unit is configured to operate at a second clock rate that is different from the first clock rate. The receiving unit is arranged such that it is capable of receiving data from the transmitting unit. The apparatus further includes a frequency generating system configured to generate the second clock rate. Further, a compensation circuit is configured to receive the second clock rate from the frequency generating system, and to synchronize the data transmitted by the transmitting unit at the first clock rate with the second clock rate. A test circuit is also provided to test performance of the apparatus.

According to another embodiment, a method includes generating data by using a transmitting unit that operates at a first clock rate, generating a second clock rate that is different from the first clock rate using a frequency generating system, and supplying the second clock rate to a compensation circuit. The method further provides for synchronization of data received from the transmitting unit with the second clock rate, and outputting synchronized data to a receiving unit operating at the second clock rate. Testing can also be performed to verify accurate reception of the synchronized data at the receiving unit.

The foregoing summary is only intended to provide a brief introduction to selected features that are described in greater detail below in the detailed description. As such, this summary is not intended to identify, represent, or highlight features believed to be key or essential to the claimed subject matter. Furthermore, this summary is not intended to be used as an aid in determining the scope of the claimed subject matter.

BRIEF DESCRIPTION OF THE DRAWINGS

Various exemplary embodiments are illustrated by way of example, and not by way of limitation, in the figures of the accompanying drawings, in which like reference numerals refer to similar elements and in which.

DETAILED DESCRIPTION

An apparatus and method for testing and simulating synchronized communication between systems having different clock rates is described. In the following description, for purposes of explanation, numerous specific details are set forth in order to provide a thorough understanding of the disclosed embodiments. It will become apparent, however, to one skilled in the art that various embodiments may be practiced without these specific details or with an equivalent arrangement. In other instances, well-known structures and devices are shown in block diagram form in order to avoid unnecessarily obscuring the various embodiments.

Figure 1:
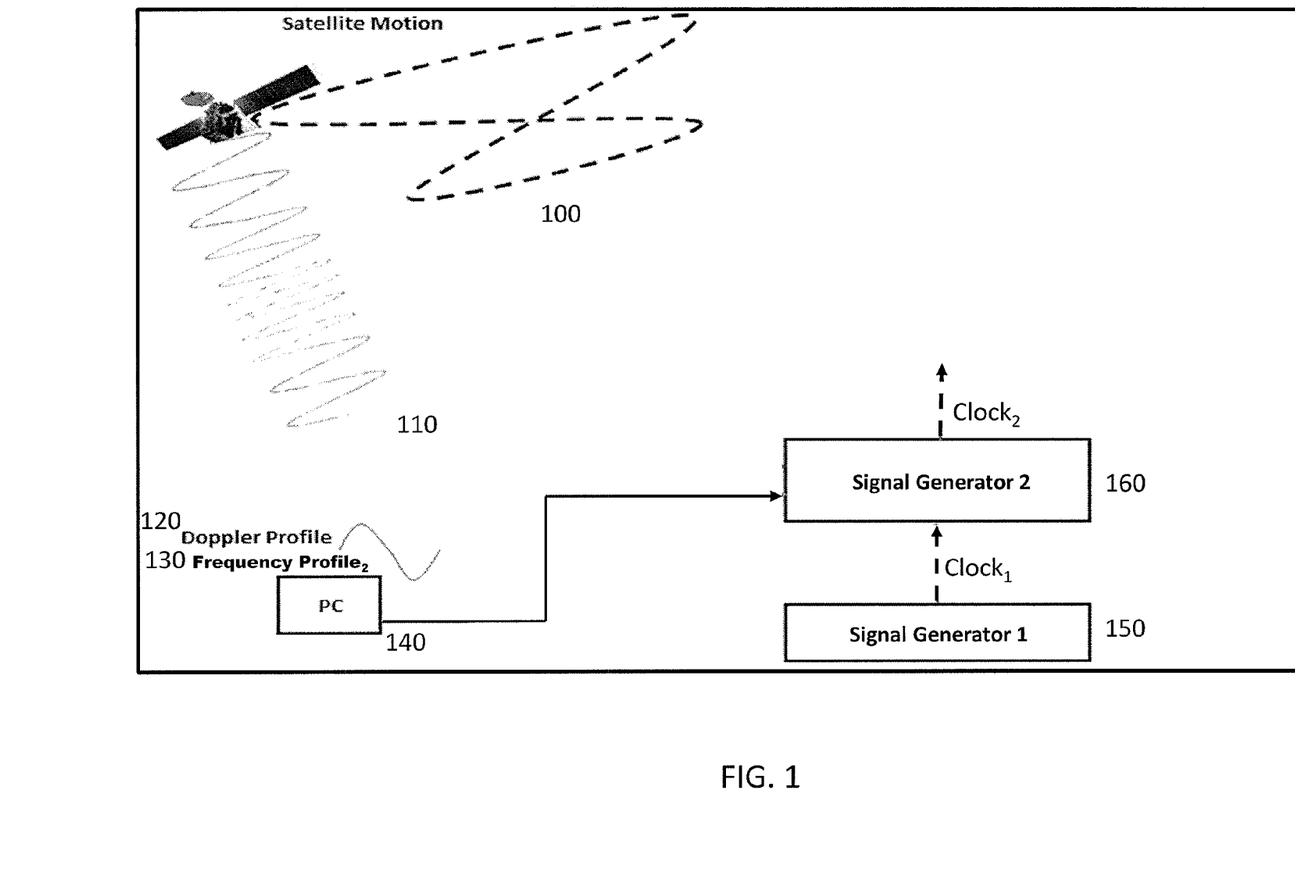
FIG. 1 is a diagram illustrating various components for generating different clock rates, in accordance with one embodiment.

FIG. 1 illustrates an arrangement of various components for generating different clock rates. As shown in FIG. 1, the arrangement can include a data processing system, such as a personal computer (PC) 140, a first signal generator 150, and a second signal generator 160. The PC 140 can be used, for example, to process data and generate various results. As will be discussed in greater detail below, the first signal generator 150 can be used to generate a reference clock rate ($Clock_1$), and the second signal generator 160 can be used to generate a modified (or second) clock rate ($Clock_2$). The first signal generator 150 generates the first clock rate, $Clock_1$, which can subsequently be supplied to the second signal generator 150. The second signal generator 160 modifies $Clock_1$, based on prescribed criteria, in order to generate $Clock_2$. The second signal generator 160 can then output $Clock_2$ with the desired variations relative to $Clock_1$.

According to an embodiment, the PC 140 can be used to simulate the effects a satellite movement pattern 100 in a testing facility. Such movement typically results from orbital drift of satellites in geosynchronous orbit, and is cyclical over a set period of time. For example, it is common for a cycle to repeat over a twenty-four hour period in the case of geosynchronous satellites. Accordingly, the satellite movement pattern 100 illustrated in FIG. 1 would repeat every twenty-four hours. The PC 140 can receive information such as Ephemeris data that is obtained, or calculated, for a particular satellite. The Ephemeris data may be supplied in various manners, such as a portable drive, flash memory, a local area network, etc.

The PC 140 processes the Ephemeris data in order to generate a Doppler profile 120 which accurately reflects changes in the satellite's communication frequency and timing signals resulting from orbital drift. According to at least one embodiment, the data stored in the PC 140 can be used to drive at least one signal generator such as, for example, the second signal generator 160, thereby causing the frequency output of the second signal generator 160 to have a predetermined profile. For example, the output of the PC 140 can be in the form of the Doppler profile 120 configured to cause the second signal generator 160 to output a frequency that incorporates the Doppler shifts resulting from the satellite movement pattern 100. According to another embodiment, the PC 140 can store various frequency profiles 130 to reflect different conditions and/or criteria. For example, the frequency profile 130 can be generated based on known clock rates of a communication system. The frequency profile 130 can also be generated based on predicted interference.

According to at least one embodiment, the second signal generator 160 can be configured to generate a second clock rate, $Clock_2$, with a predetermined varying profile. The predetermined profile can correspond, for example, to a frequency having the Doppler offset that results from orbital drift of the geosynchronous satellite. According to an embodiment, the predetermined profile can be time-varying, thus resulting in a frequency capable of being ahead of, or behind, a reference clock (i.e., $Clock_1$). For example, a frequency shift can occur where a frequency of 10.000002 MHz is generated by the second signal generator 160 compared to a reference frequency of 10.000000 MHz. Further, in an exemplary embodiment, a frequency of 9.999998 MHz can be generated compared to a reference or nominal frequency of 10.000000 MHz. Since the predetermined profile can be time-varying, the second signal generator 160 can be configured to output a frequency which transitions between 9.999998 MHz and 10.000002 MHz, according to a predetermined profile.

As previously discussed, the second signal generator 160 outputs $Clock_2$ with an offset relative to the reference clock ($Clock_2$). Although FIG. 1 illustrates two different signal generators (150, 160), other embodiments can incorporate the use of a single signal generator (not shown) configured to generate both the reference clock ($Clock_1$) and the modified clock ($Clock_2$). The reference clock can also have a predetermined frequency that is programmed into, or selected from, an internal storage of the single signal generator. The reference clock can also be generated based on global timing references such as GPS satellites. Alternatively, the single signal generator can be synchronized with the GPS satellites in advance, and independently generate the reference clock at a later time.

According to other embodiments, the first signal generator 150 can supply $Clock_1$ to the second signal generator 160 as a reference signal. The second signal generator 160 can then be configured to output both $Clock_1$ and $Clock_2$. However, $Clock_2$ could correspond to a modification of $Clock_1$ based on the Doppler profile 120, or frequency profile, received from the PC 140. According to still further embodiments, the first signal generator 150 can supply $Clock_1$ directly to the required components, or to both the second signal generator 160 and the required components.

Figure 2:
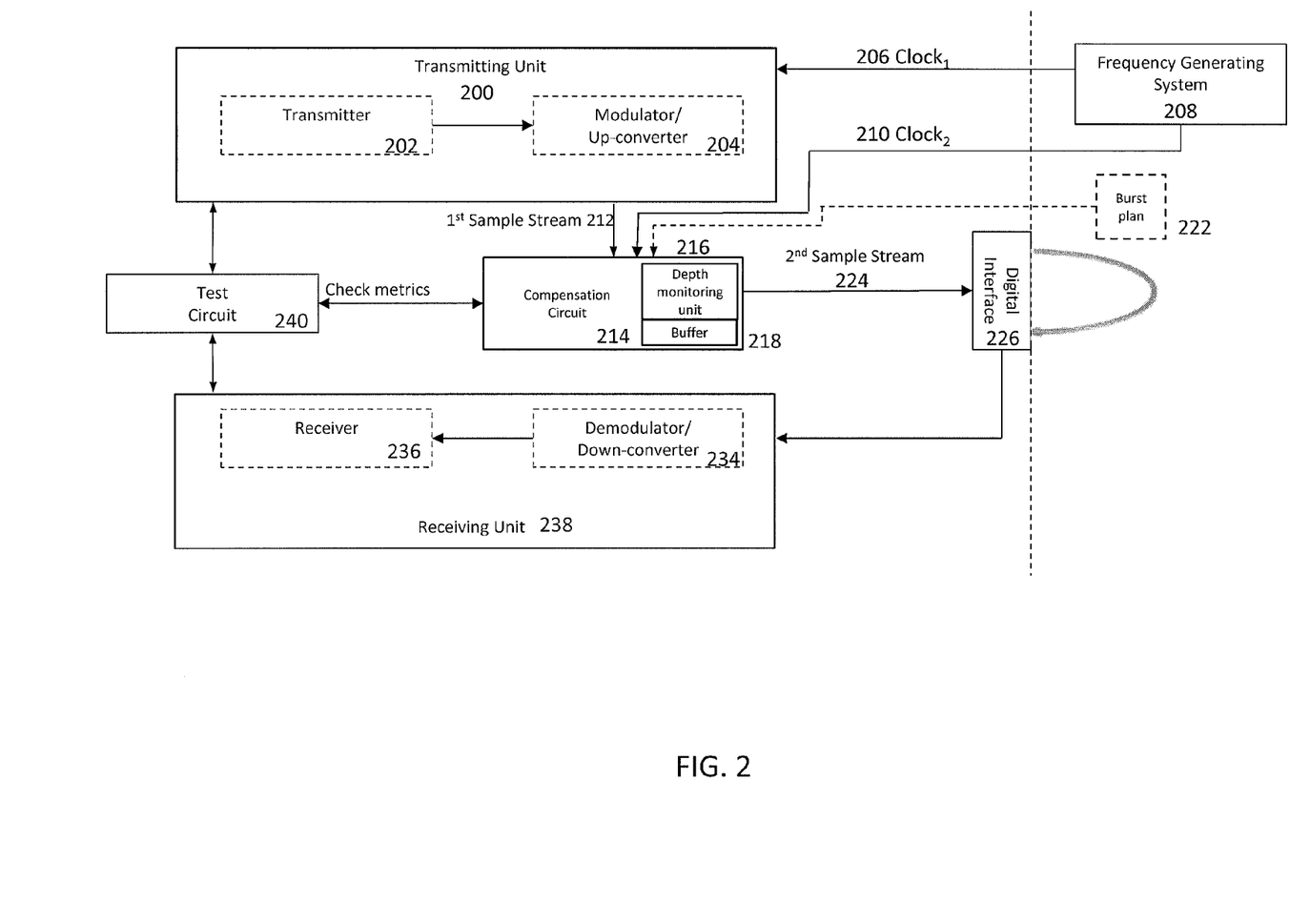
FIG. 2 is a diagram of an apparatus for testing synchronized communications, according to an embodiment.

FIG. 2 is a diagram of an apparatus for testing synchronized communication, according to an exemplary embodiment. The apparatus includes a transmitting unit 200, a receiving unit 238, a compensation circuit 214, and a test circuit 240. As illustrated in FIG. 2, the transmitting unit 200 can include a transmitter 202 and a modulator/up-converter 204, according to certain embodiments. For example, when testing synchronized communication with a satellite communication system, such components may be incorporated in the transmitting unit 200 for more accurate system representation. A conventional data communication system, however, may not require the additional functionality of a separate transmitter 202 and modulator/up-converter 204. The transmitter 202 can be configured to transmit data along a forward path to the modulator 204 so that a predetermined type of modulation can be applied. The up-converter 204 receives a modulated output signal from the modulator 204 and up-converts the signal to a higher frequency rate for transmission along the forward path.

According to at least one embodiment, the transmitting unit 200 can be configured to transmit predetermined data items, such as one or more files, stored in a non-volatile memory. Furthermore, the transmitting unit 200 can be configured to continuously transmit data for a time period corresponding to a complete cycle where there is at least one variable clock rate. More particularly, the transmitting unit 200 would transmit data continuously until all variations in clock rates have occurred. This can include time periods where one clock rate can vary between time periods where it is slower and/or faster than another clock rate. In a satellite communication system, for example, at least one clock rate can vary based on the satellite's orbital drift. In such embodiments, the transmitting unit 200 can be configured to continuously transmit data for a period of time corresponding to at least one Ephemeris cycle. Under certain conditions, such a cycle can be 24 hours in length, although other lengths may be possible. Further, in an exemplary embodiment, the transmitting unit 200 can be configured to transmit data in the form of pseudo-random patterns (PRBS-sequences).

Still referring to FIG. 2, the apparatus includes a frequency generating system 208 configured to supply the first clock rate 206 to the transmitting unit 200. According to an embodiment, the transmitting unit 200 utilizes the first clock rate 206 as a timing source to generate a first sample stream 212. The first sample stream 212 can be in the form of a plurality of sequential samples containing the predetermined data items or PRBS sequences. According one or more embodiments, the apparatus may operate in accordance with a time division multiple access (TDMA) protocol and the first sample stream can be in the form of fixed bursts within a sequence of TDMA frames. The first sample stream 212 is subsequently supplied to the compensation circuit 214.

According to at least one embodiment, the compensation circuit 214 can be configured to extract the necessary timing information for properly receiving the first sample stream 212 from information contained in the first sample stream 212 itself. According to other embodiments, however, the frequency generating system 208 can optionally supply the first clock rate 206 directly to the compensation circuit 214. As further illustrated in FIG. 2, the frequency generating system 208 supplies a second clock rate 210 to the compensation circuit 214. The compensation circuit 214 performs a synchronization process in order synchronize the first sample stream 212 with the second clock rate 210. The result is a second sample stream 224 that is timed in based on the second clock rate 210. According to one or more embodiments a predetermined burst plan 222 can be supplied to the compensation circuit 214. The burst plan 222 can contain, for example, information pertaining to the size and/or arrangement of bursts within each frame of the second sample stream 224. Furthermore, the burst plan 222 can be fixed or variable. For example, a burst plan 222 that is fixed requires the same arrangement of bursts within each frame, whereas a burst plan 222 that is variable can allow for different burst sizes and/or arrangement within different frames.

According to an embodiment, the compensation circuit 214 performs the synchronization by means of a burst placement and/or extraction process. In order to assist in facilitating this process, the compensation circuit 214 can include a buffer 218 for storing the second sample stream 224 prior to being output by the compensation circuit 214. Thus, the compensation circuit 214 receives the first sample stream 212 at the first clock rate 206, and stores the second sample stream 224 within the buffer at the second clock rate 210. Depending on the difference between the first clock rate 206 and the second clock rate 210, the buffer 218 can be susceptible to overflowing or under-flowing. For example, if the first clock rate 206 is faster than the second clock rate 210, the buffer 218 will be susceptible to an overflow condition. If the first clock rate 206 is slower than the second clock rate 210, then the buffer 218 will be susceptible to an underflow condition.

According to exemplary embodiment, the compensation circuit 214 further includes a depth monitoring unit 216 which continually monitors the state of the buffer 218. The depth monitoring unit 216 is configured to issue a buffer status command which indicates to the compensation circuit 214 that the rate at which the first sample stream 212 is being synchronized should be adjusted. The compensation circuit 214 would then perform the necessary process to add or drop samples in order to synchronize the timing of the first sample stream 212 with that of the second sample stream 224. According to one or more embodiments, the compensation circuit 214 performs the burst placement and extraction process in the manner described in co-pending application Ser. No. 14/584,652, entitled "Apparatus and method for synchronizing communication between systems with different clock rates."

The burst placement and extraction process requires that the compensation circuit add or drop appropriate samples from one or more bursts during a guard period between adjacent bursts. According to various embodiments, one or more samples at the end of a burst in the first sample stream 212 can be dropped during the guard period immediately following that burst. According to other embodiments, one or more samples at the beginning of a burst in the first sample stream 212 can be dropped during the guard period immediately preceding that burst. According to still further embodiments one or more samples at the end, and beginning, of adjacent bursts in the first sample stream 212 can be dropped during the guard period between the adjacent bursts.

As previously discussed, according to various embodiments, the difference between the first clock rate 206 and second clock rate 210 may vary. For example, the first clock rate 206 may be fixed, while the second clock rate 210 fluctuates in accordance with the Doppler profile 120. The second clock rate 210 would therefore fluctuate between a rate that is faster than the first clock rate 206 to a rate that is slower than the first clock rate 206. According to such an embodiment, and in accordance with FIG. 2, the compensation circuit 214 can be configured to synchronize the first sample stream 212 with the second clock rate 210 by dropping samples at the appropriate time when the second clock rate is slower than the first clock rate. As the second clock rate 210 becomes faster than the first clock rate 206, however, the compensation circuit would add a sample to the appropriate burst within the second sample stream 224.

According to at least one embodiment, the depth monitoring unit 216 continually monitors the buffer 218 and issues a buffer status command to indicate when various thresholds have been exceeded. For example, a test can be performed to determine whether or not the size of the buffer 218 has exceeded a predetermined maximum threshold, $T_{max}$. If the buffer size exceeds a predetermined maximum threshold, $T_{max}$, then the depth monitoring unit 216 issues a buffer status command indicating that the rate at which samples are being synchronized should be reduced. According to at least one embodiment, the compensation circuit 214 interprets this command as a request to drop at least one sample from the first sample stream 212. Additionally, the sample (or samples) is dropped during the next guard period between bursts in the first sample stream 212. If the buffer size has not exceeded the maximum threshold, however, then another test is performed in order to determine whether or not the buffer size has fallen below a predetermined minimum threshold, $T_{max}$.

If the buffer size has fallen below the minimum threshold, $T_{min}$, then the depth monitor issues a buffer status command indicating that the rate at which samples are being synchronized should be increased. In response, the compensation circuit 214 would cause an extra sample to be added to the second sample stream during the next guard period between bursts in the first sample stream. The compensation circuit 214 continues the process of synchronizing the first sample stream, and the tests for the buffer level are continually repeated until the transmitting unit 200 finishes transmission of the first sample stream 212.

According to an embodiment, the apparatus includes a digital interface 226 configured to provide a pathway for simulating transmission of an output stream and reception of an input stream. The digital interface 226 is arranged to receive the second sample stream 224 from the compensation circuit 214. The digital interface 226 then transfers the second sample stream 224 to the receiving unit 238. According to at least one embodiment, the digital interface 226 simulates transmission/reception of the second sample stream 224 to/from an external network such as a satellite communication system. Thus the receiving unit 238 receives the second sample stream 224 in the same manner as other transmission from the satellite or external network. Upon receiving the second sample stream 224, the demodulator/down-converter 234 is configured to perform the necessary demodulation and down-conversion to recover the transmitted data, in accordance with the modulation present on the signal. Depending on the specific embodiment being used, it may not be necessary to incorporate the demodulator/down-converter 234 and/or receiver 236. For example, such additional functionality may be necessary when testing satellite communication systems, but not for testing certain conventional communication systems.

According to an embodiment, the receiving unit 238 can be configured to operate at the same clock rate (e.g., the second clock rate 210) as the second sample stream 224. Thus, the receiving unit 238 would be able to properly receive the second sample stream 224 from the digital interface 226. As previously discussed, the receiving unit 238 can retrieve information pertaining to the second clock rate 210 directly from the second sample stream 224. According to other embodiments, however, the apparatus can be configured to receive the second clock rate 210 directly from the frequency generating system 208.

As illustrated in FIG. 2, the apparatus includes a test circuit 240 configured to determine whether or not the information transmitted by the transmitting unit 200 has been properly received by receiving unit 238. According to at least one embodiment, the transmitting unit 200 and the receiving unit 238 can be configured to supply the information transmitted and the information received, respectively, to the test circuit 240 so that the proper testing can be performed. According to other embodiments, the test circuit 240 may be configured to directly access storage devices and/or memory contained within the transmitting unit 200 and the receiving unit 238. The test circuit 240 can be configured to determine proper reception of the information by performing various tests on the data received by the receiving unit 240. For example, the test circuit 240 can be configured to perform tests such as a cyclic redundancy check (CRC), a bit error rate (BER) check, etc., in order to identify any errors in the data received by the receiving unit. According to other embodiments, the test circuit 240 can be configured to verify accurate reception of the data by comparing information received at the receiving unit 238 with the original information transmitted by the transmitting unit 200.

As illustrated in FIG. 2, the test circuit 240 can be configured to check various performance metrics associated with the compensation circuit 214. For example, at least one embodiment provides for computation of an estimated number of samples dropped and/or added by the compensation circuit 214. The test circuit 240 can compare the estimated numbers to the actual count of samples added and/or dropped by the compensation circuit 214. The resulting comparison can provide an indication as to whether the compensation circuit 214 is performing the synchronization process in an expected or predicted manner. According to further embodiments, the test circuit 240 can be configured to analyze the timing at which the compensation circuit 214 added or dropped samples in order to determine if the correct samples were added or dropped.

While FIG. 2 illustrates synchronization of the first sample stream on the transmission side, it is also possible to perform synchronization on the receive side. According to an embodiment, the transmitting unit 200 can be configured to supply the first sample stream directly to the digital interface 226, which then supplies the first sample stream to the compensation circuit 214. The compensation circuit 214 would then perform the necessary synchronization, and output a second sample stream to the receiving unit 238. Various embodiments can provide for synchronization in both the transmit and receive directions. According to such embodiments, the transmitting unit 200 can be configured to supply the first sample stream to the compensation circuit so that a second sample stream can be generated and output to the digital interface 226. A second compensation circuit (not shown) can be provided to receive the second sample stream from the digital interface 226. The second compensation circuit can be configured to perform a synchronization process to generate a new sample stream (e.g., a third sample stream) in the same manner previously described. The third sample stream (not shown) would then be output to the receiving unit 238.

Figure 3:
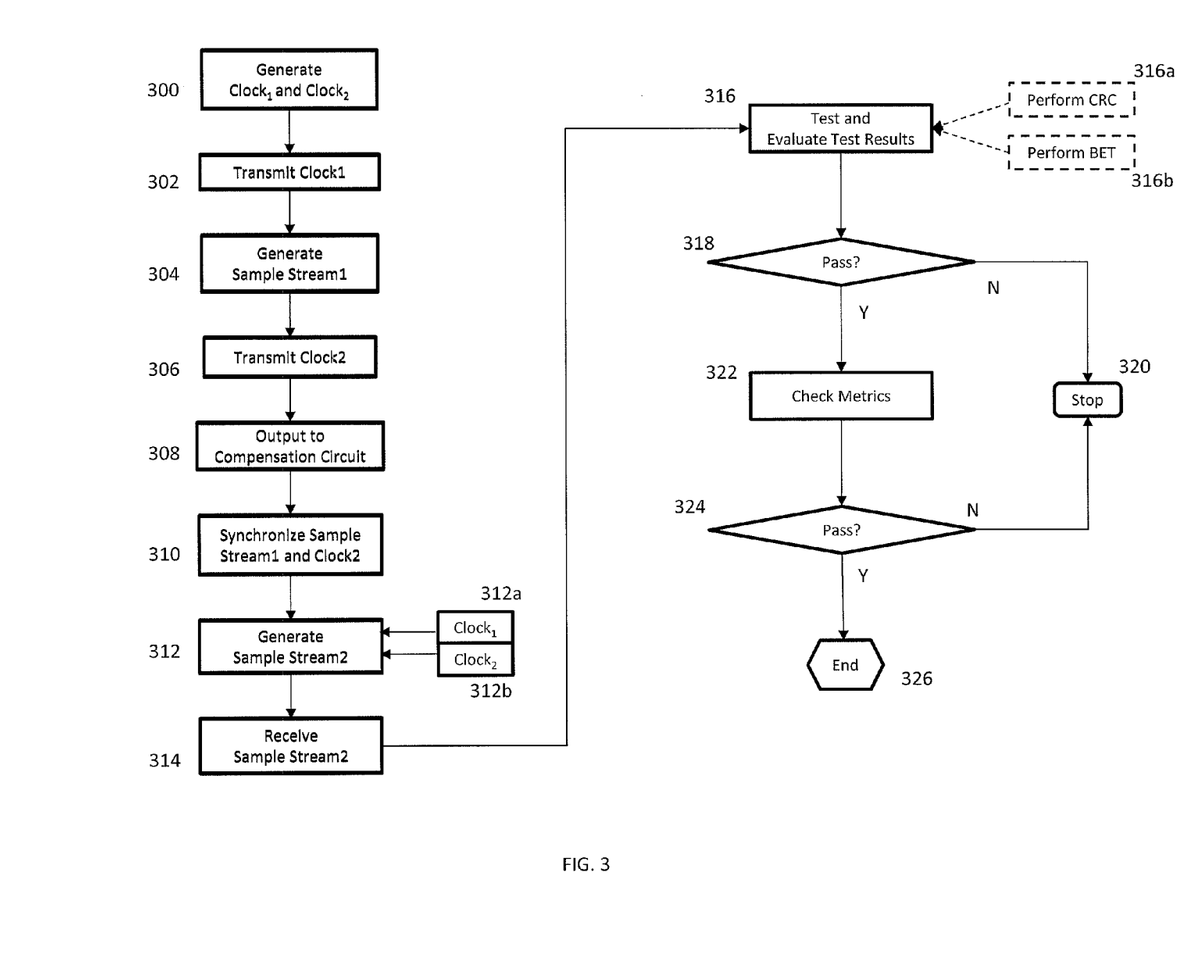
FIG. 3 is a flowchart illustrating steps performed in testing synchronized communication, according to an embodiment.

FIG. 3 is a flowchart illustrating the steps performed in testing synchronized transmissions, according to at least one embodiment. At 300, a first clock rate, $Clock_1$ and a second clock rate, $Clock_2$ are generated. According to at least one embodiment, the second clock rate is different from the first clock rate. Furthermore, the second clock rate can vary such that it is faster or slower than the first clock rate at different times. At 302, the first clock rate is transmitted, for example, to the transmitting unit. The transmitting unit generates a first sample stream at 304. The first sample stream is generated using the first clock rate. At 306, the second clock rate is transmitted, for example, to the compensation circuit. At 308, the first sample stream is output to the compensation circuit. As previously discussed, various embodiments allow the compensation circuit to extract information pertaining to the first clock rate directly from the first sample stream. Optionally, the first clock rate can be supplied directly to the compensation circuit.

According to the exemplary embodiment illustrated in FIG. 3, the compensation circuit synchronizes 310 the first sample stream that is received from the transmitting unit with the second clock rate. As previously discussed, the first sample stream is generated at the first clock rate. During the synchronization, the compensation circuit uses at least one buffer to store the synchronized data and a depth monitoring unit to monitor contents of the buffer. According to an embodiment, the depth monitoring unit can supply a buffer status command which informs the compensation circuit whether to increase or decrease the rate at which the first sample stream is being synchronized. At 312, the compensation circuit generates the second sample stream.

According to the illustrated embodiment, the second sample stream corresponds to synchronized data resulting from synchronization with the second clock rate. According to further embodiments, the first clock rate and the second clock rate can be supplied to the compensation unit while generating the second sample stream, or during the synchronization, as indicated as 312a and 312b. Furthermore, although the second sample stream is indicated as being generated at 312, the second sample stream can be generated as part of 310 where the first sample stream is synchronized. Thus, the steps illustrated in FIG. 3 are not intended to be sequence specific. Rather, various steps can be performed at different points of the process without affecting the outcome.

At 314, the second sample stream is received by the receiving unit. As previously discussed, the second clock rate can be supplied directly to the receiving unit, or it can be extracted from the second sample stream. At 316, the data from the second sample stream is tested and evaluated in order to determine if any errors have been generated. According to various embodiments, the test performed can include CRC, BET, etc., as indicated at 316a and 316b. At 318, it is determined whether the tests have been passed. If the test results indicate a failure (e.g., incorrect data has been received), then the process is stopped at 320. According to an embodiment, this can indicate the presence of additional problems that may require attention from an operator. For example, the operator may be required to take additional steps such as further debugging, analysis of the clock signals, repeating the test, etc.

According to an embodiment, if the test is successful, various performance metrics associated with the compensation circuit are checked at 322. As previously discussed, such metrics can involve, for example, determining whether the correct number of samples were dropped/added, or whether the compensation circuit dropped/added samples at the appropriate times. At 324, it is determined whether or not a successful result was obtained from the metrics check. If the results indicate, for example, that the compensation circuit did not properly perform the synchronization, then the process is stopped at 320. If the result of checking the performance metrics indicates that the synchronization was properly performed, then the process ends at 326.

Figure 4:
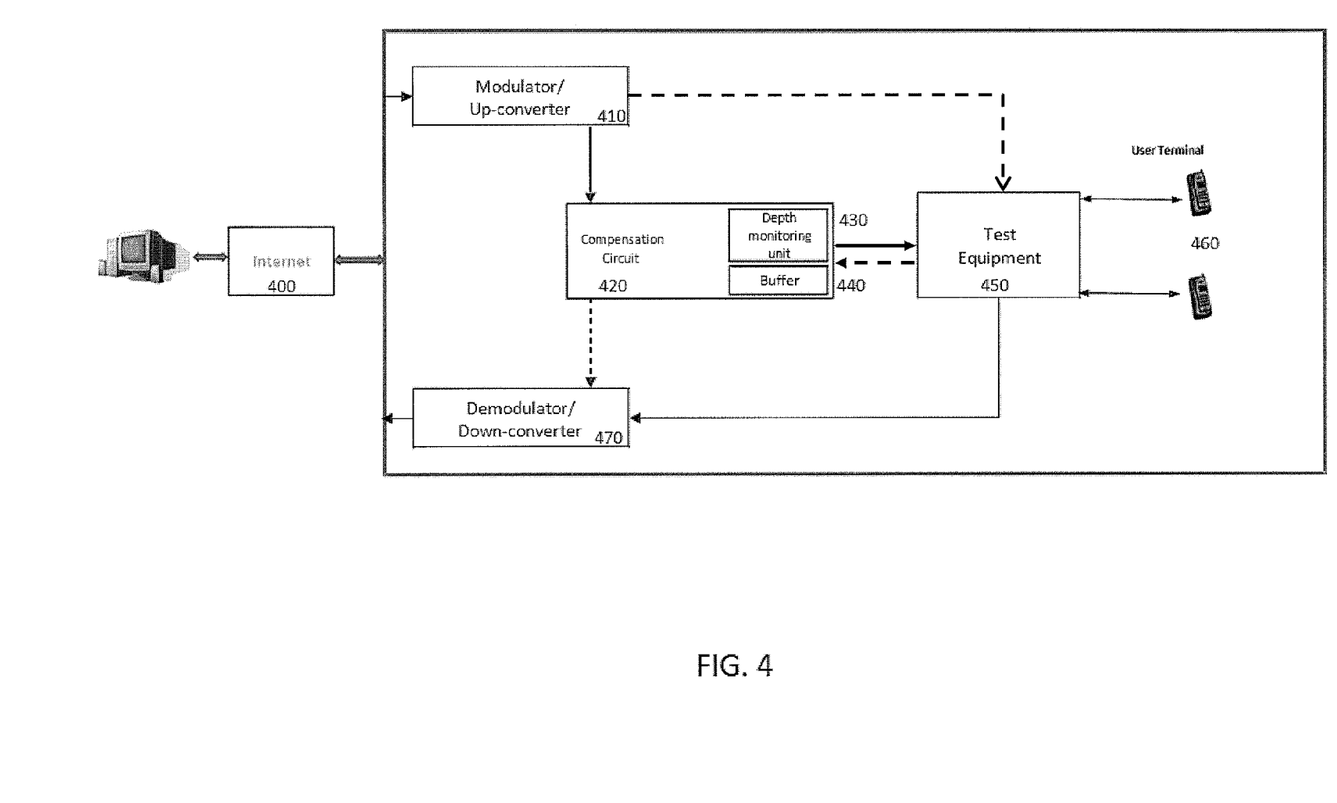
FIG. 4 is a diagram of an apparatus for testing synchronized communications, in accordance with another embodiment.

FIG. 4 is a diagram of an apparatus for testing synchronized communication, in accordance with another embodiment. According to the illustrated embodiment, the test apparatus is configured to transmit data from a network, such as the internet 400, and to receive data at different user terminals 460. The user terminals 140 can also transmit data to the test apparatus for output to the network. According to at least one embodiment, apparatus can include, for example a modulator/up-converter 410 for processing data received from the internet and a demodulator/down-converter 470 for processing data prior to output to the internet. Depending on the specific network being tested (e.g., data, mobile, satellite), it may not be necessary to incorporate a modulator/up-converter 410 or a demodulator/down-converter 470.

According to an embodiment, the apparatus includes a compensation circuit 420 configured in a manner similar to that previously described. More particularly, the compensation circuit includes a buffer 440 and depth monitoring unit 430 which monitors the contents of the buffer. The modulator/up-converter 410 generates a first sample stream from the received internet data and outputs the first sample stream to the compensation circuit 420. Although not illustrated in FIG. 4, the compensation circuit 420 receives a second clock rate in a manner similar to that previously described with respect to FIG. 2. According to at least one embodiment, the apparatus includes test equipment 450 which includes appropriate components and/or circuitry to generate the second clock rate based on various criteria for the test being conducted. For example, if the test relates to satellite communication, then the test equipment 450 would be capable of utilizing Ephemeris data to generate the second clock rate such that it contains an appropriate frequency offset. According to other embodiments, the test equipment 450 may be configured to provide the second clock rate at a fixed and/or varying rate relative to the first clock rate. According to still further embodiments, the test equipment 450 can include at least one signal generator, as previously discussed with respect to FIG. 1, configured to generate the first clock rate and the second clock rate.

The compensation circuit 420 performs burst placement and/or extraction in order to synchronize the first sample stream with the second clock rate and generate a second sample stream. The second sample stream is subsequently output to the test equipment 450. According to an embodiment, the test equipment 450 can be configured to simulate operation of a satellite communication system by establishing, for example, communication links with the user terminals 460. Thus, from the point of view of the user terminals 460, communication appears to be directly with the satellite. Data received from the user terminals 460 by the test equipment 450 can be supplied to the demodulator/down-converter 470 for output to the internet 400.

According to at least one embodiment, the compensation circuit 420 can be configured to perform burst placement and/or extraction only on data received from the user terminals 460. According to such embodiments, the modulator/up-converter 410 generates and supplies the first sample stream directly to the test equipment 450 for output to the user terminals 460. Data from the user terminals 460 received by the test equipment 450 is supplied to the compensation circuit 420 in the form of a second sample stream, as though it were received directly from the satellite. More particularly, the data is in the form of a sample stream which has been generated at the second clock rate. According to the illustrated embodiment, the compensation circuit 420 performs the necessary burst placement and/or extraction to synchronize the second sample stream with the first clock rate and generate a third sample stream that is supplied to the demodulator/down-converter 470. Such a flow path is indicated by the dashed lines. The third sample stream is processed by the demodulator/down-converter 470, and subsequently output to the internet 400.

Although the apparatus illustrated in FIG. 4 shows a single compensation circuit 420 for synchronizing data transmitted to the user terminals 460, various embodiments can provide for a second compensation circuit (not shown) for independently synchronizing data received from the user terminals 460. According to such embodiments, the modulator/up-converter 410 generates a first sample stream that is supplied to the first compensation circuit 420. The compensation circuit 420 synchronizes the first sample stream with second clock rate to generate a second sample stream that is supplied to the test equipment 450 and subsequently output to the user terminals 460. The test equipment 450 further supplies a third sample stream received from the user terminals 460 to the second compensation circuit. The second compensation circuit then synchronizes the third sample stream with the first clock rate in order to generate a fourth sample stream. The second compensation circuit then outputs the fourth sample stream to the demodulator/down-converter 470.

While certain exemplary embodiments and implementations have been described herein, other embodiments and modifications will be apparent from this description. Accordingly, the various embodiments described are not intended to be limiting, but rather are encompassed by the broader scope of the presented claims and various obvious modifications and equivalent arrangements.

What is claimed is:

1. An apparatus comprising:
a transmitting unit configured to operate at a first clock rate, the transmitting unit including a modulator and an up-converter configured to arrange a data in the form of a first sample stream containing a plurality of TDMA frames;
a receiving unit, configured to operate at a second clock rate that is different from the first clock rate, and arranged to receive the data from the transmitting unit;
a frequency generating system configured to generate the second clock rate;
a compensation circuit configured to:
receive a burst plan containing information regarding the size and/or arrangement of bursts within the plurality of frames in the first sample stream,
receive the second clock rate from the frequency generating system, and
synchronize the data transmitted by the transmitting unit at the first clock rate with the second clock rate based, at least in part, on the received burst plan; and
a test circuit configured to test performance of the apparatus,
wherein the compensation circuit is further configured to add samples to, or drop samples from, either the first sample stream or a second sample stream of time division multiple access (TDMA) frames during a predetermined time period, and
wherein the predetermined time period corresponds to a guard period between TDMA bursts within the first sample stream, the second sample stream, or both the first sample stream and the second sample stream.

2. The apparatus of claim 1, wherein the data synchronized by the compensation circuit is configured as a second sample stream.

3. The apparatus of claim 1, wherein the frequency generating system is configured to generate the second clock rate with a predetermined varying profile relative to the first clock rate.

4. The apparatus of claim 3, wherein the transmitting unit and the receiving unit are configured for satellite communications, and wherein the predetermined varying profile is derived from telemetry data of one or more satellites used for communication.

5. The apparatus of claim 1, wherein the frequency generating system is configured to generate the first clock rate and supply the first clock rate to the transmitting unit.

6. The apparatus of claim 1, wherein the first clock rate is based on timing from Global Positioning Satellites (GPS) and the second clock rate is based on a Doppler-shifted offset to the timing from the GPS and orbital drift of a satellite which communicates with a satellite transmission system.

7. The apparatus of claim 1, wherein the transmitting unit is configured to continuously transmit the data for a time period corresponding to one terrestrial rotation.

8. The apparatus of claim 1, wherein the compensation circuit comprises:
   at least one buffer configured to store the data synchronized by the compensation circuit, and
   a depth monitoring unit configured to monitor contents of the at least one buffer and transmit a buffer status command indicative of the size of the at least one buffer.

9. The apparatus of claim 8, wherein the buffer status command is configured to prompt the compensation circuit to add or drop samples.

10. The apparatus of claim 9, wherein the buffer status command is configured to indicate that a buffer size exceeds a predetermined maximum threshold, and the compensation circuit is configured to synchronize the data by dropping at least one sample from the first sample stream.

11. The apparatus of claim 9, wherein the buffer status command is configured to indicate that a buffer size falls below a predetermined minimum threshold, and the compensation circuit is configured to synchronize the data by adding at least one sample to the second sample stream.

12. The apparatus of claim 1, wherein the apparatus transmits the data based on a time division multiple access (TDMA) protocol and the transmitting unit is configured to supply back to back TDMA bursts across multiple channels.

13. The method of claim 12, wherein verifying accurate reception comprises performing at least one of a cyclic redundancy check (CRC) and a bit error rate (BER) check.

14. The apparatus of claim 1, wherein the test circuit is further configured to verify accurate reception of the data by the receiving unit.

15. The apparatus of claim 14, wherein the test circuit is configured to verify accurate reception by performing at least one of a cyclic redundancy check (CRC) and a bit error rate (BER) check.

16. A method comprising:
   generating data in the form of a first sample stream containing a plurality of TDMA frames using a transmitting unit that operates at a first clock rate;
   generating a second clock rate using a frequency generating system, the second clock rate being different from the first clock rate;
   receiving a burst plan containing information regarding the size and/or arrangement of bursts within the plurality of frames in the first sample stream;
   supplying the second clock rate to a compensation circuit;
   synchronizing the data received from the transmitting unit with the second clock rate using the compensation circuit based, at least in part, on the received burst plan;
   outputting synchronized data to a receiving unit at the second clock rate; and
   verifying accurate reception of the synchronized data at the receiving unit,
   wherein the synchronizing further includes adding samples to, or dropping samples from, either the first sample stream or a second sample stream of time division multiple access (TDMA) frames during a predetermined time period, and
   wherein the predetermined time period corresponds to a guard period between TDMA bursts within the first sample stream, the second sample stream, or both the first sample stream and the second sample stream.

17. The method of claim 16, wherein generating the second clock rate further comprises generating the second clock rate with a predetermined varying profile relative to the first clock rate.

18. The method of claim 17, wherein the transmitting unit and the receiving unit are configured for satellite communications, and wherein the predetermined varying profile is derived from telemetry data of one or more satellites used for communication.

19. The method of claim 16, wherein the first sample stream is generated for a time period corresponding to one terrestrial rotation.

20. The method of claim 16, wherein the second clock rate corresponds to a Doppler offset of the first clock rate resulting from orbital drift of a geosynchronous satellite.

21. The method of claim 16, wherein the synchronizing comprises:
   monitoring at least one buffer that stores the data transmitted by the transmitting unit; and
   generating a buffer status command indicative of a state of the at least one buffer to the transmitting unit.

22. The method of claim 21, wherein the buffer status command prompts the compensation circuit to add or drop samples.

23. The method of claim 22, wherein the buffer status command indicates that a buffer size exceeds a predetermined maximum threshold, and wherein synchronizing comprises dropping at least one sample from the first sample stream.

24. The method of claim 22, wherein the buffer status command indicates that a buffer size falls below a predetermined minimum threshold, and synchronizing comprises adding at least one sample to the second sample stream.

* * * * *